(12) United States Patent
Sugiyama et al.

(10) Patent No.: US 6,741,378 B2
(45) Date of Patent: May 25, 2004

(54) OPTICAL MODULATOR HAVING ELEMENT FOR VARYING OPTICAL PHASE BY ELECTROOPTIC EFFECT

(75) Inventors: Masaki Sugiyama, Kawasaki (JP); Masaharu Doi, Kawasaki (JP); Tadao Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/285,419

(22) Filed: Nov. 1, 2002

(65) Prior Publication Data

US 2003/0151793 A1 Aug. 14, 2003

(30) Foreign Application Priority Data

Feb. 8, 2002 (JP) ........................... 2002/033080

(51) Int. Cl.⁷ .............................. G02F 1/03; G02F 1/07
(52) U.S. Cl. .................... 359/245; 359/254; 359/315
(58) Field of Search ................................ 359/237, 240, 359/246, 254, 298, 255, 315, 322; 257/678; 385/2–3, 8, 14, 40, 131

(56) References Cited

U.S. PATENT DOCUMENTS

| 5,991,491 | A | 11/1999 | Madabhushi | 385/131 |
| 6,192,167 | B1 | 2/2001 | Kissa et al. | 385/3 |
| 2002/0190359 | A1 * | 12/2002 | Shaw et al. | 257/678 |

2003/0002766 A1 * 1/2003 Pruneri et al. ............... 385/2

OTHER PUBLICATIONS

K. Noguchi et al., "Frequency–dependent propagation characteristics of coplanar waveguide electrode on 100 GHz Ti:LiNbO₃ optical modulator", Electronics Letter, Apr. 2, 1998, vol. 34, No. 7.

Yoon et al., "Design and RF Characteristics of Traveling–Wave Electrodes for High–Speed Lithium Niobate Optical Modulators", Tencon 99. Proceedings of the IEEE Region 10 Conference Cheju Island, South Korea 15–17, Sep. 15, 1999,1 pp. 35–38.

* cited by examiner

*Primary Examiner*—Jordan M Schwartz
*Assistant Examiner*—Jessica Stultz

(57) ABSTRACT

A low voltage modulation signal can be realized while reducing reflection and radiation of a high frequency modulation signal in an optical modulator. The optical modulator includes an electrooptic effect element, a relay substrate constituted of a dielectric wafer on which a coplanar waveguide, and a connector supplying a modulation signal of microwave band to the electrooptic effect element, wherein, when the modulation signal includes a component of 30 GHz, a pad space between the signal electrode pad and the ground electrode pad of the electrooptic effect element is defined as S μm, and a pad height is defined as H μm, the pad height is no greater than 300 μm and the relation is set as $$-0.002H^2+1.3H-160<S<0.0025H^2-1.6H+550.$$

9 Claims, 11 Drawing Sheets

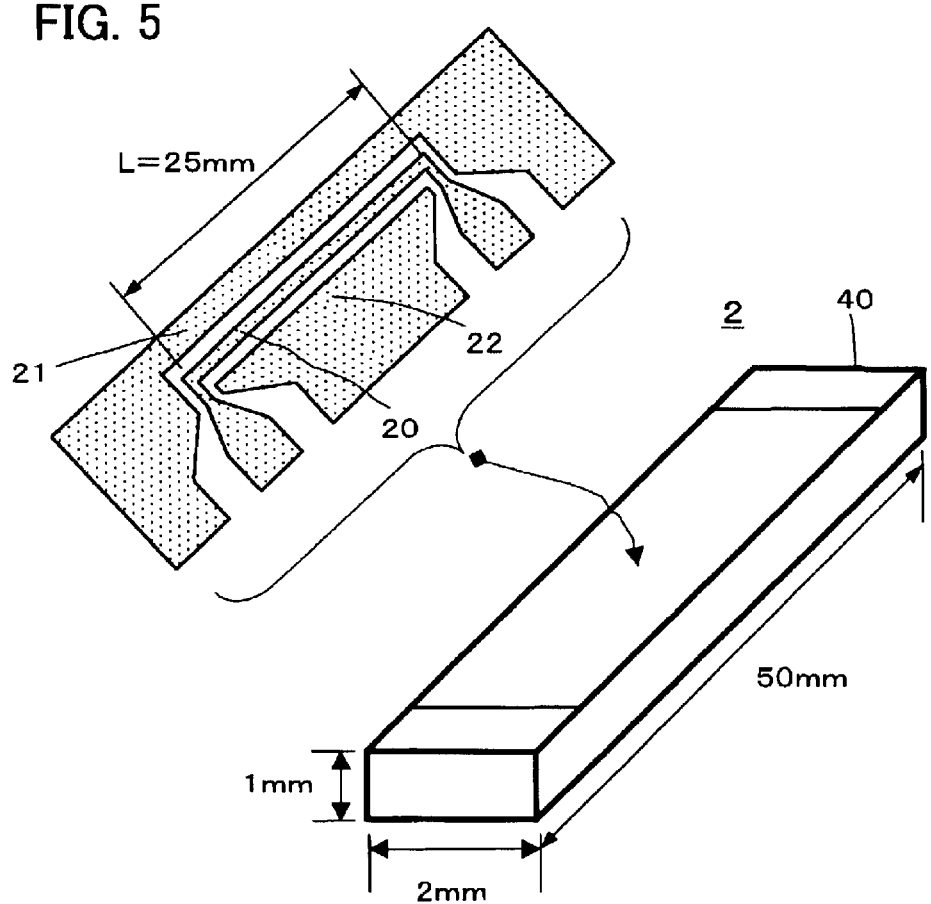

OPTICAL MODULATOR HAVING ELEMENT FOR VARYING OPTICAL PHASE BY ELECTROOPTIC EFFECT

FIELD OF THE INVENTION

The present invention relates to an optical modulator in which an element for varying optical phase by the electrooptic effect is mounted.

BACKGROUND OF THE INVENTION

An optical communication system is used as a large capacity broadband communication system. In such an optical communication system, higher bit rate is required in transmission as demand for larger communication capacity increases.

Meanwhile, in the optical communication system, there is employed an optical modulator having an element, which varies optical phase by the electrooptic effect changing a refractive index when electric field is applied on a ferroelectric crystal, etc.

Such an element varying the optical phase by the electrooptic effect (hereinafter the element is simply referred to as electrooptic effect element) to be mounted on the optical modulator is provided with an optical waveguide formed on a wafer cut out of an electrooptic crystal of $LiNbO_3$, $LiTaO_2$, etc. with a metallic film of Ti, etc. produced thereon through patterning and thermal diffusion or proton exchange in benzoic acid by the IC production technique. Further a required electrode is formed in the vicinity of the optical waveguide.

The optical modulator has such a configuration that an optical signal is supplied from outside the electrooptic effect element to the optical waveguide so as to supply a high frequency modulation signal of a microwave band to an electrode formed in the vicinity of the optical waveguide.

FIG. 1 is a top plan view of one configuration example of the optical modulator with a cover removed. An electrooptic effect element 2 is housed in a shielding case 1. FIGS. 2A through 2C are schematic configuration diagrams of electrooptic effect element 2.

To function as an optical modulator, an exemplary optical waveguide 10 formed on electrooptic effect element 2 is made to branch into two parallel waveguides to configure a Mach-Zehnder waveguide. FIG. 2B is a cross-sectional view along line 'a' in the plan view shown in FIG. 2A. Also FIG. 2C is a cross-sectional view along line 'b'.

As an example, when using a Z-cut wafer for electrooptic effect element 2 cut out from an $LiNbO_3$ crystal in the Z-axis direction, constituting an electrode of a single electrode, and applying a modulation scheme of the intensity modulation, a signal electrode 20 is disposed right on top of either one of the parallel branch waveguides, while a ground electrode 22 is disposed right on top of the other branch waveguide. Further, a buffer layer constituted of $SiO_2$, etc. is provided between the substrate and signal electrode 20 and between the substrate and ground electrode 22, so as to prevent the optical signal traveling in the two parallel waveguides from being absorbed by signal electrode 20 and ground electrode 22.

In FIG. 2A, an optical signal is input to an incident side (Opt In) of waveguide 10. To function as an optical modulator, a rectangular microwave signal output from a signal source 25 is supplied to signal electrode 20 as a modulation signal in the same direction as the traveling direction of the optical signal. Accordingly, the refractive indexes of each parallel optical waveguide branching into two are varied in the mutually opposite directions, producing variation of optical phase difference in the parallel optical waveguides. An intensity modulated optical signal is then output from an output side (Opt Out) of optical waveguide 10 in FIG. 2A.

Here, in the configuration of the optical modulator shown in FIG. 1, the high frequency microwave signal supplied from signal source 25 as a modulation signal is supplied to between signal electrode 20 and ground electrodes 21, 22 through an RF connector 3 having a center conductor 30 and an external conductor 31.

Center conductor 30 of RF connector 3 is inserted into a sliding contact member 32 and is connected between signal electrode 20 of electrooptic effect element 2 and sliding contact member 32 with bonding. Also external conductor 31 of RF connector 3 is connected to ground electrodes 21, 32 of electrooptic effect element 2 with wire bonding 23.

Further, in the case the wavelength of high frequency signal is long as compared to the size of the electrodes in electrooptic effect element 2, the characteristics of electrooptic effect element 2 is not substantially affected. However, when the wavelength becomes shorter, this affects the high frequency characteristic of electrooptic effect element 2, resulting in producing radiation and reflection on the high frequency signal. As a result, it becomes difficult to obtain wideband transmission characteristic in electrooptic effect element 2. Further, the sizes of sliding contact member 32 and center conductor 30 of RF connector 3 are minute on the order of several tens of $\mu$m and therefore it is very hard to assemble.

To solve the aforementioned problem, the inventors of the present invention have been studying a method of connecting RF connector 3 and electrooptic effect element 2 via a relay substrate. In this case, it is to be considered that each of the own characteristic impedance of RF connector 3, the relay substrate and electrooptic effect element 2 is designed as 50 $\Omega$.

In particular, in the case wire bonding is used to connect between electrooptic effect element 2 and the relay substrate, similar to the case of connecting RF connector 3 to electrooptic effect element 2 shown in FIG. 1, it is to be considered to maintain the characteristic impedance as 50 $\Omega$ so as to prevent microwave reflection, thus to broaden the gap between the wire bonding area (hereafter referred to as pad) of signal electrode 20 and ground electrodes 21, 22.

However, if the aforementioned gap between the pad of signal electrode 20 and the pads of ground electrodes 21, 22 is broadened, there arises a problem that the electric field becomes broaden and the radiating microwave component becomes increased. This produces deterioration of transmission property. Moreover, when the frequency in use becomes higher, the degree of radiation becomes greater.

Meanwhile, if the pad width W of signal electrode 20 is set narrower, there arises another problem of difficulty in connecting to the relay substrate with bonding.

SUMMARY OF THE INVENTION

Accordingly, it is an object of the present invention to provide an optical modulator mounting an element which varies optical phase by the electrooptic effect, having a feature of refraining the increase of radiation ratio even when microwave frequency in use becomes higher, as well as a feature of easily connecting to the relay substrate with bonding.

As a first embodiment of the present invention to attain the aforementioned object, an optical modulator includes; an electrooptic effect element having a signal electrode and a ground electrode thereupon each provided with a pad and varying optical phase by the electrooptic effect and; a relay substrate constituted of a dielectric wafer on which a coplanar waveguide connected to the signal electrode pad and the ground electrode pad on the electrooptic effect element is formed; and a connector having a center conductor and an external conductor respectively connected to the coplanar waveguide of the relay substrate, and supplying a modulation signal of microwave band to the signal electrode of the electrooptic effect element, wherein when the modulation signal includes a component of 30 GHz and a pad space between the signal electrode pad and the ground electrode pad of the electrooptic effect element is defined as S μm and a pad height is defined as H μm, the pad height is no greater than 300 and the relation is set as $$-0.002H^2+1.3H-160<S<0.0025H^2-1.6H+550$$

As a second embodiment of the present invention, an optical modulator includes; an electrooptic effect element having a signal electrode and a ground electrode thereupon each provided with a pad, and varying optical phase by the electrooptic effect and; a relay substrate constituted of a dielectric wafer on which a coplanar waveguide connected to the signal electrode pad and the ground electrode pad on the electrooptic effect element is formed; and a connector having a center conductor and an external conductor respectively connected to the coplanar waveguide of the relay substrate, and supplying a modulation signal of microwave band to the signal electrode of the electrooptic effect element, wherein when the modulation signal includes a component of 40 GHz and a pad space between the signal electrode pad and the ground electrode pad of the electrooptic effect element is defined as S μm and a pad height is defined as H μm, the pad height is no greater than 300 and the relation is set as $$-0.002H^2+1.3H-160<S<0.001H^2-0.8H+370$$

As a third embodiment of the present invention, an optical modulator includes; an electrooptic effect element having a signal electrode and a ground electrode thereupon each provided with a pad, and varying optical phase by the electrooptic effect and; a relay substrate constituted of a dielectric wafer on which a coplanar waveguide connected to the signal electrode pad and the ground electrode pad on the electrooptic effect element is formed; and a connector having a center conductor and an external conductor respectively connected to the coplanar waveguide of the relay substrate, and supplying a modulation signal of microwave band to the signal electrode of the electrooptic effect element, wherein when the modulation signal includes a component of 30 GHz and a characteristic impedance by the signal electrode pad and the ground electrode pad of the electrooptic effect element is defined as $Z_O$ Ω and a pad height is defined as H μm, the pad height is no greater than 300 and the relation is set as $$-0.0005H^2+0.32H-19<Z_0<0.00061H^2-0.34H+98$$

As a fourth embodiment of the present invention, an optical modulator includes; an electrooptic effect element having a signal electrode and a ground electrode thereupon each provided with a pad, and varying optical phase by the electrooptic effect and; a relay substrate constituted of a dielectric wafer on which a coplanar waveguide connected to the signal electrode pad and the ground electrode pad on the electrooptic effect element is formed; and a connector having a center conductor and an external conductor respectively connected to the coplanar waveguide of the relay substrate, and supplying a modulation signal of microwave band to the signal electrode of the electrooptic effect element, wherein when the modulation signal includes a component of 40 GHz and a characteristic impedance by the signal electrode pad and the ground electrode pad of the electrooptic effect element is defined as $Z_O$ [Ω] and a pad height is defined as H [μm], the pad height is no greater than 300 and the relation is set as $$-0.0005H^2+0.32H-19<Z_0<0.000093H^2-0.061H+57$$

As a fifth embodiment of the present invention, in the first embodiment or the second embodiment, the pad space between the signal electrode pad and the ground electrode pad is set as 130 μm.

As a sixth embodiment of the present invention, in the third embodiment or the fourth embodiment, the characteristic impedance by the signal electrode pad and the ground electrode pad of the electrooptic effect element is set as 42 Ω.

As a seventh embodiment of the present invention, in either of the first embodiment to the sixth embodiment, a width of the signal electrode pad of the electrooptic effect element is between 30 μm and 70 μm.

As an eighth embodiment of the present invention, in either of the first embodiment to the sixth embodiment, widths of the signal electrode pad and the ground electrode pad of the electrooptic effect element are 50 lm.

As a ninth embodiment of the present invention, in either of the first embodiment to the sixth embodiment, each characteristic impedance of the relay substrate and the RF connector is set as 50 Ω.

Further scopes and features of the present invention will become more apparent by the following description of the embodiments with the accompanied drawings.

BRIEF DESCRIPTION OF THE DRAWINGS

FIG. 5 shows an embodiment of electrooptic effect element 2, an element varying optical phase by electrooptic effect, provided in an optical modulator as an object of the present invention.

DETAILED DESCRIPTION OF THE PREFERRED EMBODIMENTS

The preferred embodiments of the present invention are described hereinafter referring to the charts and drawings. Prior to the description of the embodiments, for the sake of easy understanding of the present invention, there is explained a detailed configuration for connecting RF connector 3 and electrooptic effect element 2 using a relay substrate which has been studied by the inventors of the present invention.

Figure 1:
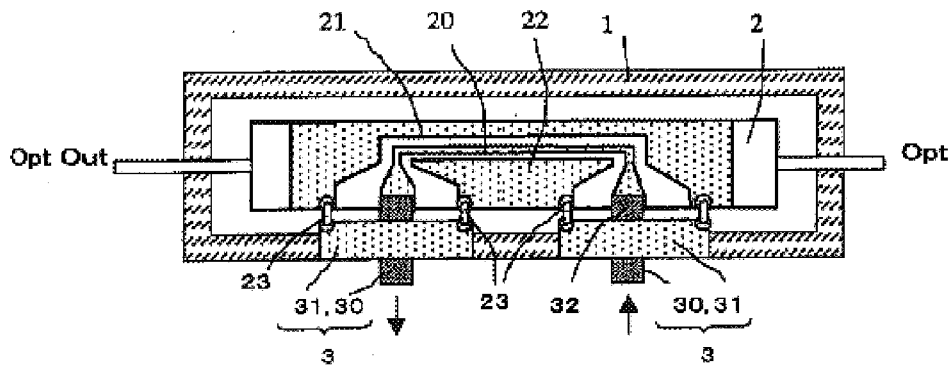
FIG. 1 shows a top plan view of an exemplary configuration of an optical modulator with the cover thereof removed.
Figure 2A:
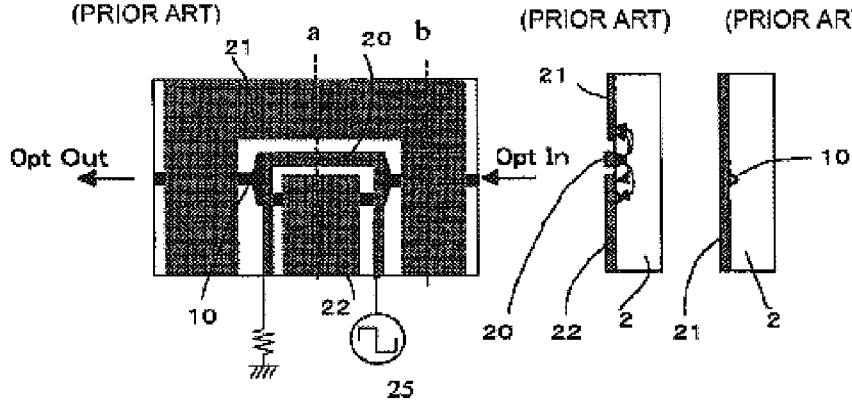
FIGS. 2A through 2C show schematic diagrams of electrooptic effect element 2.
Figure 2B:
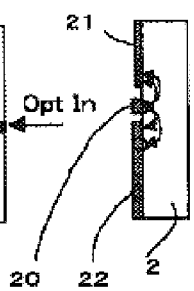
Figure 2C:
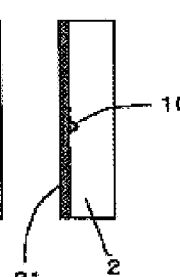
Figure 3:
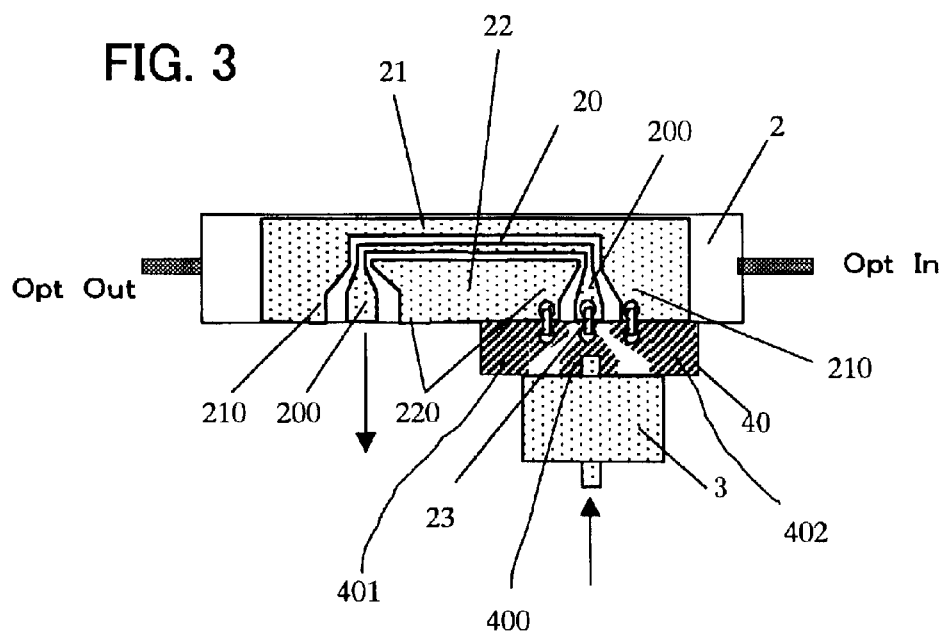
FIG. 3 shows an exemplary configuration of the optical modulator studied under the concept by the inventors of the present invention.

FIG. 3 is a diagram illustrating a configuration example to connect RF connector 3 to electrooptic effect element 2 using a relay substrate which has been studied by the inventors of the present invention.

In FIG. 3, relay substrate 40 has signal electrode 400 connected to signal electrode 20 and ground electrodes 21, 22 of electrooptic effect element 2, and a coplanar waveguide having ground electrodes 401, 402 each disposed on either side of signal electrode 400 on a dielectric wafer such as $AL_2O_3$.

Electrooptic effect element 2 is connected to relay substrate 40 by the connection between each pad 200, 210, 220 of electrooptic effect element 2 and each corresponding electrode 400, 401, 402 of the waveguide with wire bonding 23.

Here, in FIG. 3, though the connection between relay substrate 40 and RF connector 3 is shown for the input side only, the output side is also connected to a non-illustrated RF connector via relay substrate 40.

Also, pad 200 of signal electrode 20 has electrode width W so as to connect to signal electrode 400 on the coplanar waveguide of relay substrate 40, as shown in FIGS. 4A, 4B in which only electrode patterns are illustrated.

Meanwhile, a non-illustrated RF cable for connecting signal source 25 and RF connector 3 generally has a characteristic impedance of 50 Ω. Accordingly, as for RF connector 3 and relay substrate 40, each of the own characteristic impedance is designed to be 50 Ω.

Therefore, as for pads 200, 210 and 220 in electrooptic effect element 2, it is considered necessary to maintain each characteristic impedance as 50 Ω so as to prevent microwave reflection. One method to satisfy the above is to broaden a gap S between pad 200 of signal electrode 20 and pads 210, 220 of ground electrodes 21, 22.

However, as mentioned earlier, if gap S between pad 200 of signal electrode 20 and pads 210, 220 of ground electrodes 21, 22 is broadened, such a problem arises that the electric field is broadened and accordingly the radiated microwave component increases and the transmission property is deteriorated. If the microwave frequency of use becomes higher, the degree of the radiation becomes greater.

Meanwhile, if the width W of pad 200 is made narrower, there arises a problem that the connection between relay substrate 40 and pad 200 with bonding becomes difficult.

Taking this into consideration, the inventors of the present invention have studied to find that an optimal condition for transmission property which enables to reduce the microwave reflection and radiation in the input/output portions of electrooptic effect element 2, i.e. pads 200, 210 and 220 even when the characteristic impedance deviates as a result of broadening the size of gap S between the aforementioned pad 200 of signal electrode 20 and pads 210, 220 of ground electrodes 21, 22.

According to the present invention, there is provided an optical modulator which mounts an element varying optical phase by the electrooptic effect with this newly found optimal condition for transmission property.

FIG. 5 is an embodiment of electrooptic effect element 2 which varies optical phase by the electrooptic effect in the optical modulator of the present invention.

Signal electrode 20 and ground electrodes 21, 22 having mutually functioning electrode length L with a similar electrode pattern shown in FIGS. 4A, 4B are formed by patterning on a $LiNbO_3$ substrate 40 having 2 mm in width, 1 mm in height and 50 mm in length.

Here, desirably the voltage of the high frequency signal is set lower because it is difficult to produce high power of a drive circuit located at the last stage of signal source 25 for producing high frequency signals. However, in the case the loss of high frequency signals is large, a limit exists to make low voltage of the high frequency signals. From this viewpoint, it is important to reduce the loss of high frequency signals.

Now, considering loss of high frequency signal as a modulation signal, the loss is produced in input/output RF connector 3 and relay substrate 40, in input portion of electrooptic effect element 2, i.e. pads 200, 210 and 220, and by mutually functioning length L of electrodes 20, 21 and 22.

Here, the loss produced in RF connector 3 and relay substrate 40 is on the order of 0.5 dB at the input side and the output side of RF connector 3, respectively, when the characteristic impedance is set to 50 Ω. Also, the loss caused by mutually functioning electrode length L is fixedly determined by the lengths of electrodes 20, 21 and 22.

Meanwhile, the loss produced in the input portion of electrooptic effect element 2, i.e. pads 200, 210 and 220, is caused by reflection and radiation. It has been considered essential that the impedance of these pads are to be fit to the characteristic impedance of RF connector 3 and relay substrate 40, that is 50 Ω.

However, in regard to the loss produced in pads 200, 210 and 220, the inventors of the present invention have found after studying various cases that there exists an optimal condition rather than fitting to the characteristic impedance, 50 Ω, of RF connector 3 and relay substrate 40.

This condition is studied in the following embodiments.

First Embodiment

Figure 4:
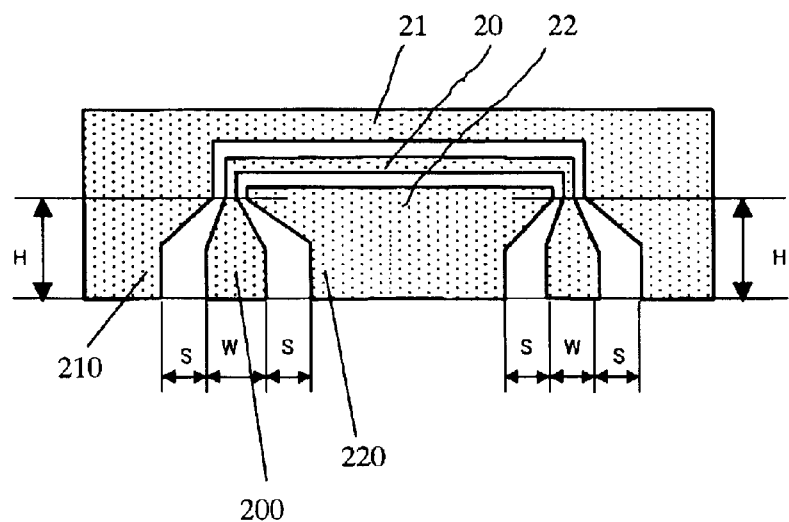
FIG. 4 shows a diagram illustrating electrode pattern formed on the electrooptic effect element.

In the electrode pattern shown in FIG. 4, width W of pad 200 of signal electrode 20 is assumed to be 50 μm. Also the modulation signal frequency is assumed to be 30 GHz.

Loss S21 was calculated, which was caused by reflection by measuring S21 when space S was varied between pad 200 and pads 210, 220 with height H of pad 200 varied to 300 μm, 200 μm and 100 μm, respectively. Loss S21 was also calculated caused by reflection when varying the characteristic impedance.

Here, loss S21 is a value obtained from the ratio of an input signal level and an output signal level.

Figure 6A:
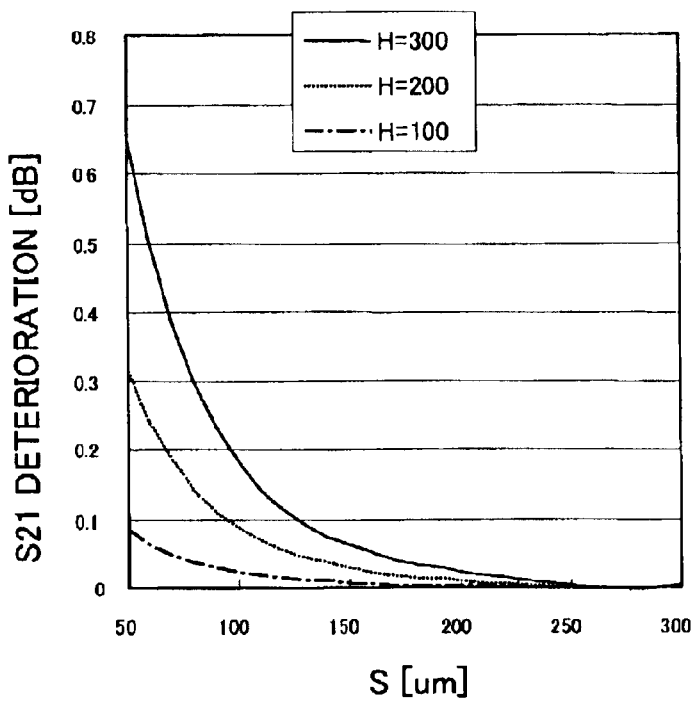
FIGS. 6A and 6B show charts illustrating the modulation signal loss caused by reflection at the modulation frequency of 30 GHz.
Figure 6B:
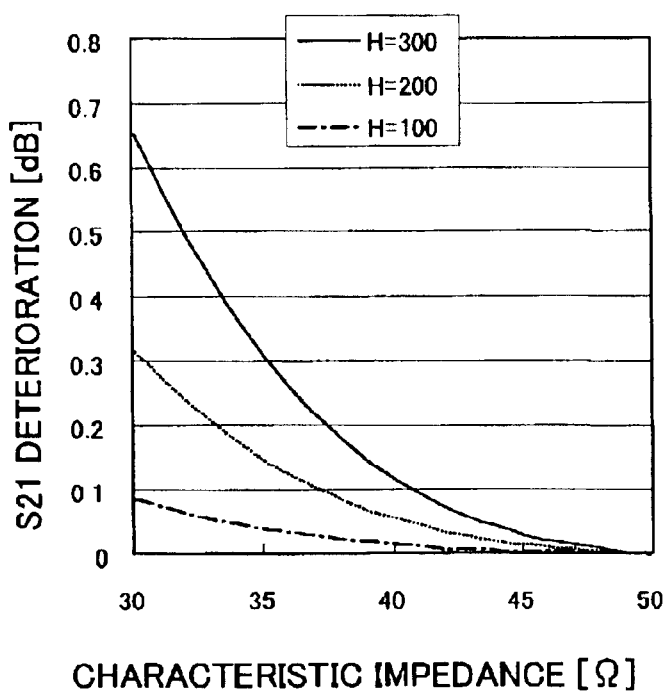

FIGS. 6A and 6B show the results of the aforementioned measurement. FIG. 6A is a chart representing loss by reflection when pad space S is varied, and FIG. 6B represents loss by reflection when varying the characteristic impedance.

Figure 7A:
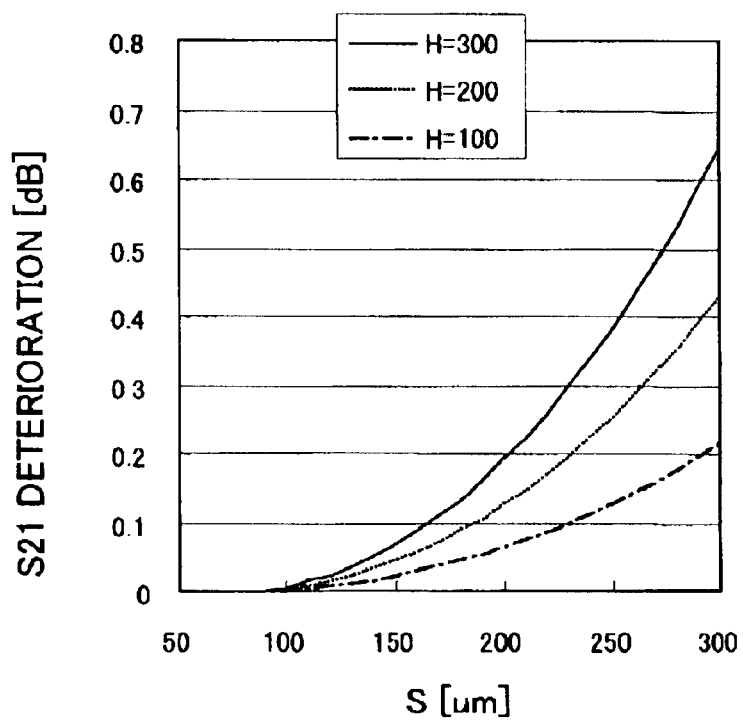
FIGS. 7A and 7B show charts illustrating the modulation signal loss caused by radiation at the modulation frequency of 30 GHz.
Figure 7B:
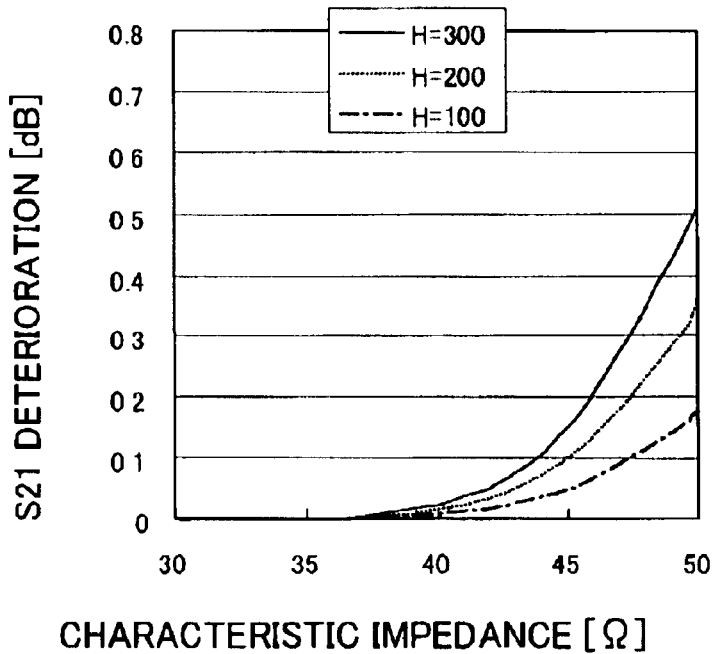

Meanwhile, using the same condition as the above, loss caused by radiation is measured, the results of which are shown in FIGS. 7A and 7B. The chart shown in FIG. 7A represents loss by radiation when varying pad space S, and the chart shown in FIG. 7B represents loss by radiation when varying the characteristic impedance.

Figure 8A:
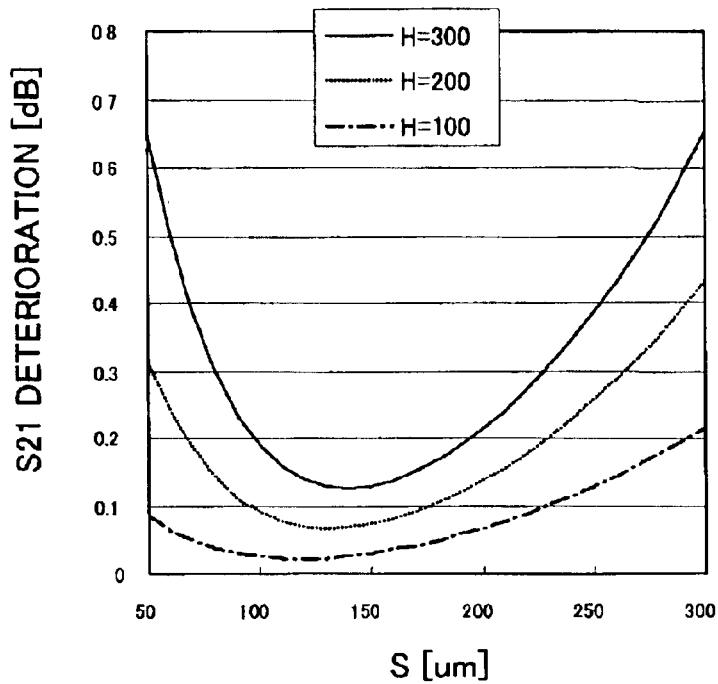
FIGS. 8A and 8B show charts illustrating the modulation signal loss caused by reflection and radiation at the modulation frequency of 30 GHz.
Figure 8B:
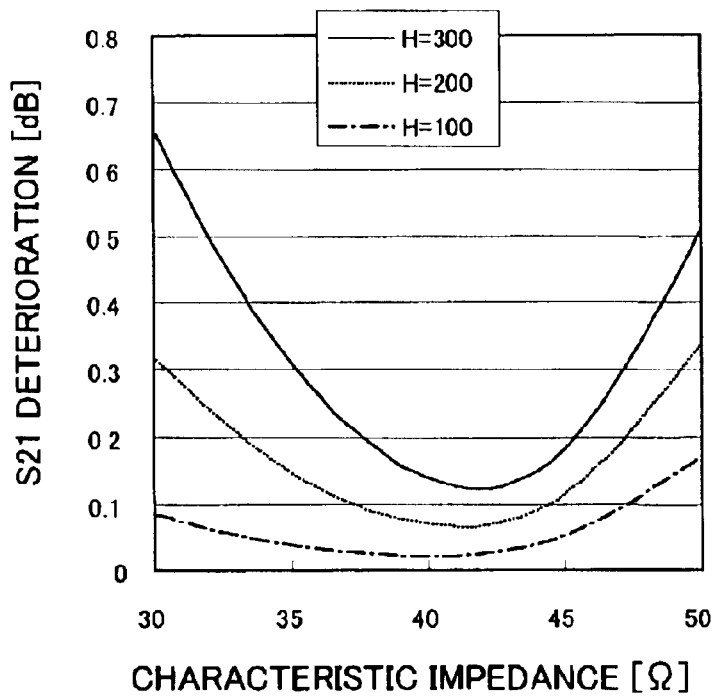

Further, FIGS. 8A and 8B are charts in which the loss by reflection shown in FIGS. 6A, 6B is added to the loss by radiation shown in FIGS. 7A, 7B, respectively. FIG. 8A represents loss when varying pad space S and FIG. 8B represents loss when varying the characteristic impedance.

It is understood from FIG. 8A that the loss caused by reflection and radiation becomes minimum when pad space S is set as 130 μm, irrespective of the height H of pads 200, 210 and 220 set as 300 μm, 200 μm or 100 μm. Also, from FIG. 8B, it is shown that the loss becomes minimum when the characteristic impedance is set as 40 Ω.

As mentioned earlier, the loss produced in relay substrate 40 and the input side of RF connector 3 is approximately 0.5 dB, as well as the loss produced in relay substrate 40 and the output side of RF connector 3.

Therefore, considering the loss allowed in the input and output portion of electrooptic effect element 2 is up to the equivalent degree, the upper limit and the lower limit in the tolerable range of pad space S when loss S21 is no greater than 0.5 dB varies with pad height H in FIG. 8A.

Figure 12:
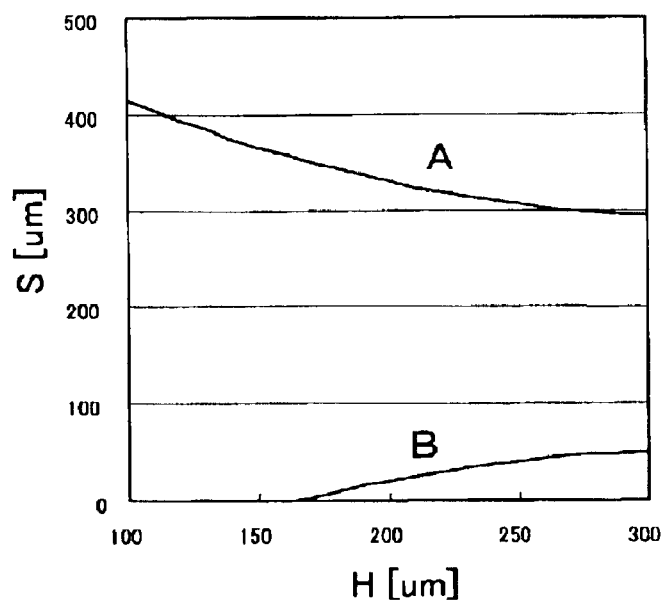
FIG. 12 shows a chart illustrating the tolerable upper limit of a pad space S as well as the tolerable lower limit thereof when varying a pad height H at the modulation frequency of 30 GHz.

FIG. 12 is a chart illustrating upper limit A and lower limit B of pad space S when varying pad height H obtained from the charts shown in FIGS. 8A, 8B.

Accordingly, when the modulation signal has a component of 30 GHz, the tolerable range of pad space S has the relation shown below: height H is less than 300 μm, and $$-0.002H^2+1.3H-160 \leq S \leq 0.0025H^2-1.6H+550$$

where the space between the signal electrode pad and the ground electrode pad of the electrooptic effect element is defined as S μm, and the pad height is defined as H μm.

From this relation, for example when H=300 μm, the tolerable size of S becomes between 50 μm and 280 μm.

Figure 13:
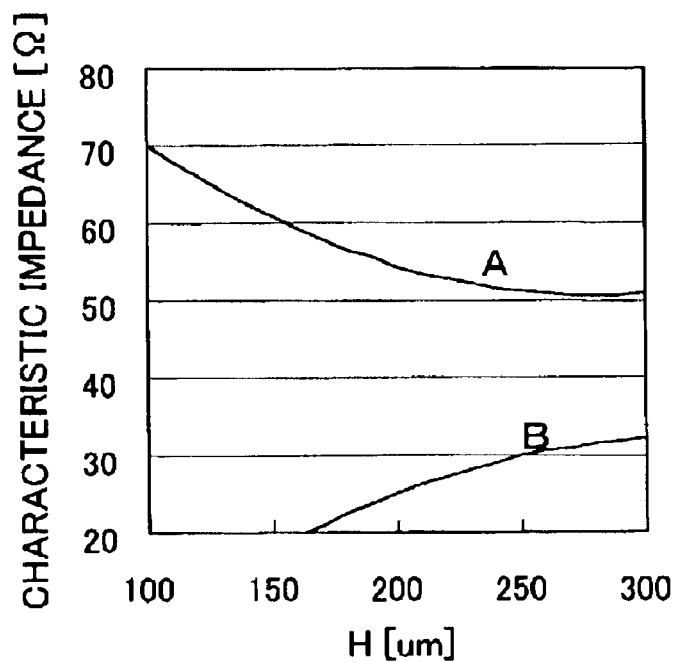
FIG. 13 shows a chart illustrating the tolerable upper limit of the characteristic impedance $Z_0$ as well as the tolerable lower limit thereof when varying pad height H at the modulation frequency of 30 GHz.

As for the characteristic impedance, FIG. 8B indicates that the value which minimizes the loss is 41 Ω. In a similar manner to the above, when the loss of no greater than approximately 0.5 dB is allowed, which is equivalent to the loss produced in the input side and the output side of RF connector 3 and relay substrate 40, the tolerable characteristic impedance $Z_0$ Ω is within the range of upper limit A and lower limit B shown in FIG. 13, which satisfies the relation shown below:

$$-0.0005H^2+0.32H-19 < Z_0 < 0.00061H^2-0.34H+98$$

where $Z_0$ is the characteristic impedance.

Second Embodiment

In a similar manner to the first embodiment, width W of pad 200 of signal electrode 20 is assumed to be 50 μm. However, in this second embodiment, the modulation signal frequency is assumed to be 40 GHz.

Loss S21 was calculated, which was caused by reflection by measuring S21 when space S was varied between pad 200 and pads 210, 220 with height H of pad 200 varied to 300 μm, 200 μm and 100 μm, respectively. Loss S21 was also calculated caused by reflection when varying the characteristic impedance.

Figure 9A:
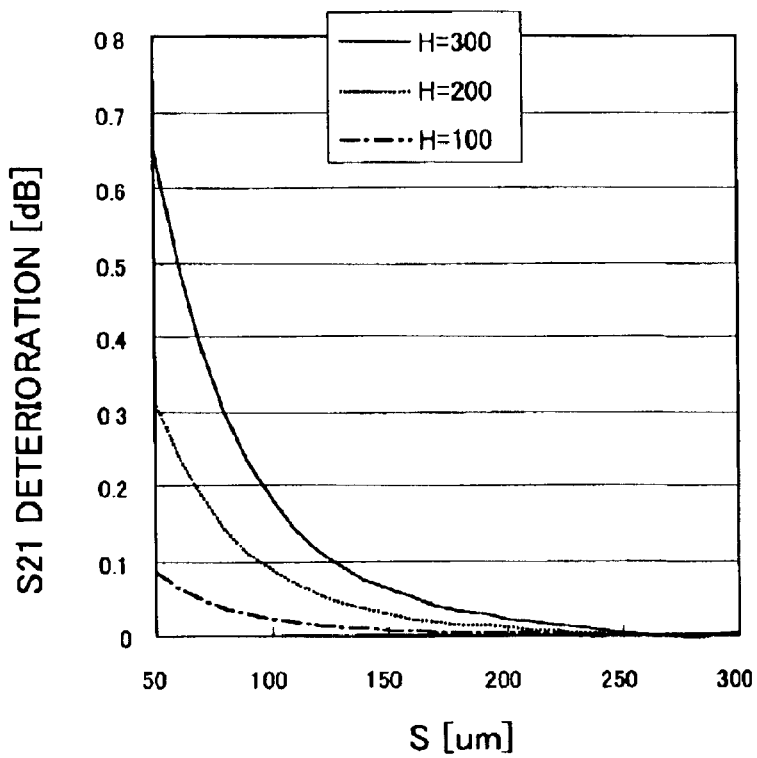
FIGS. 9A and 9B show charts illustrating the modulation signal loss caused by reflection at the modulation frequency of 40 GHz.
Figure 9B:
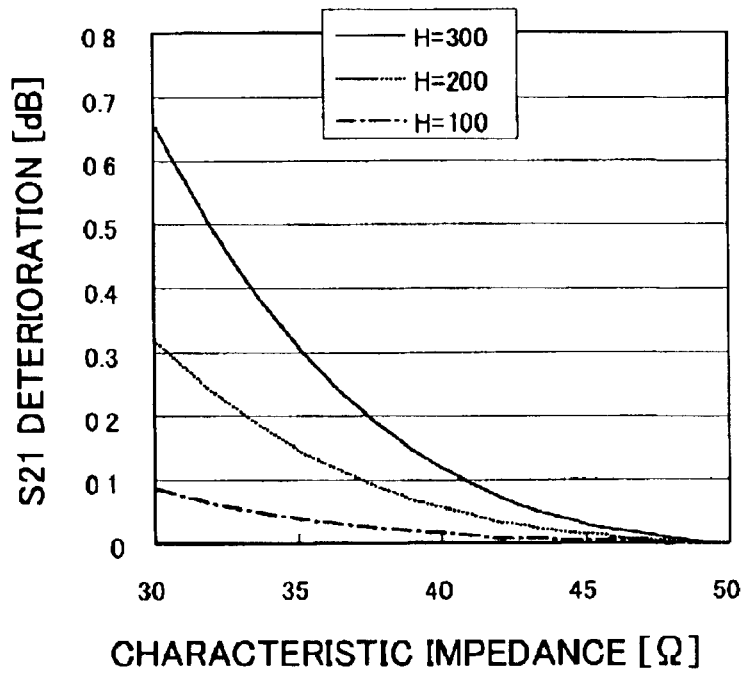

FIGS. 9A and 9B are the results of the aforementioned measurement, where FIG. 9A is a chart representing loss by reflection when pad space S is varied, and FIG. 9B represents loss by reflection when varying the characteristic impedance.

Figure 10A:
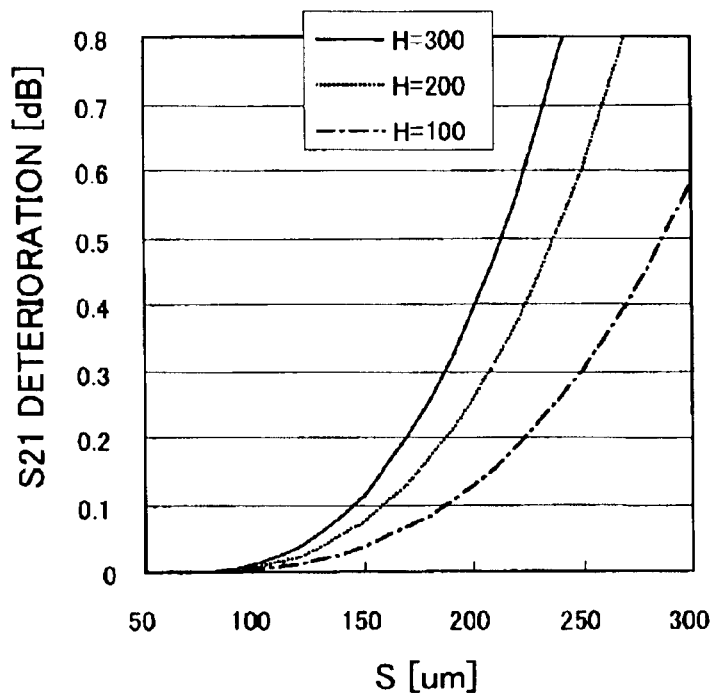
FIGS. 10A and 10B show charts illustrating the modulation signal loss caused by radiation at the modulation frequency of 40 GHz.
Figure 10B:
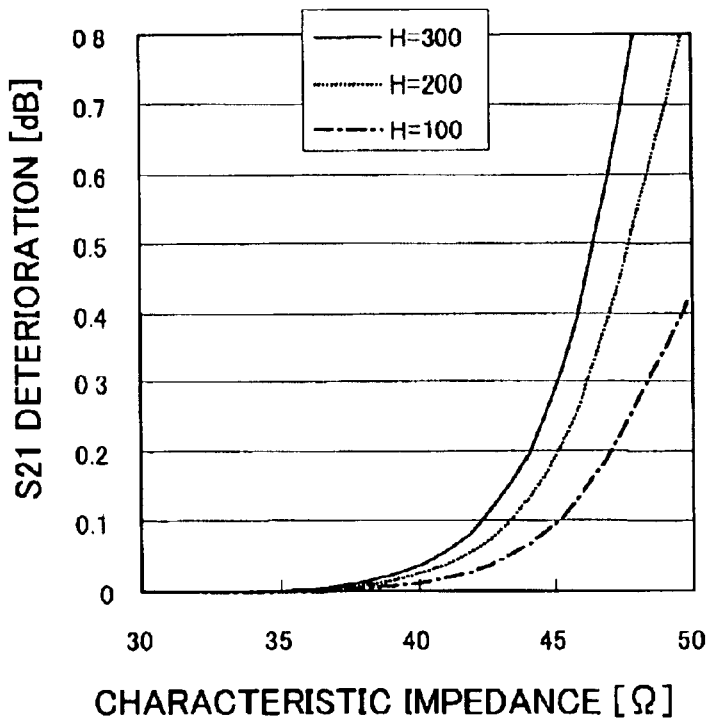

Meanwhile, using the same condition as the above, loss caused by radiation is measured, the results of which are shown in FIGS. 10A and 10B. The chart shown in FIG. 10A represents loss by radiation when varying pad space S, and the chart shown in FIG. 10B represents loss by radiation when varying the characteristic impedance.

Figure 11A:
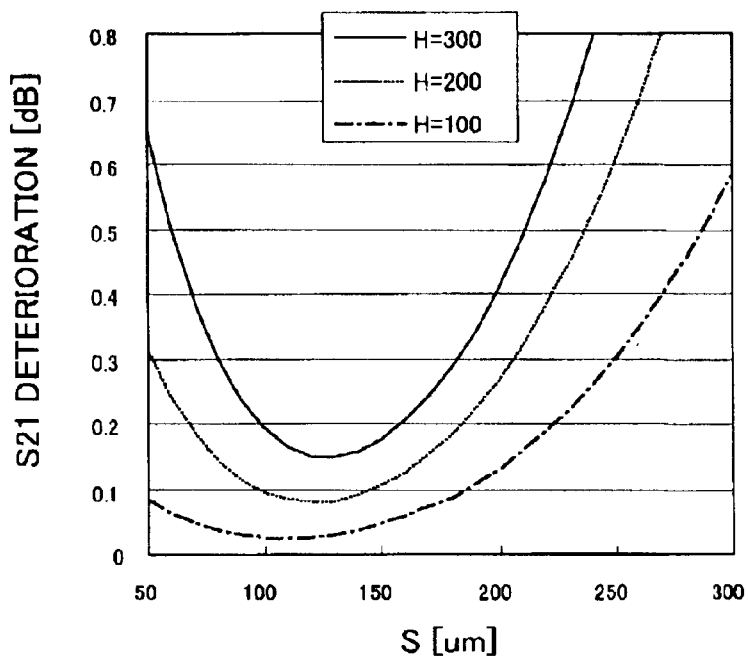
FIGS. 11A and 11B show charts illustrating the modulation signal loss caused by reflection and radiation at the modulation frequency of 40 GHz.
Figure 11B:
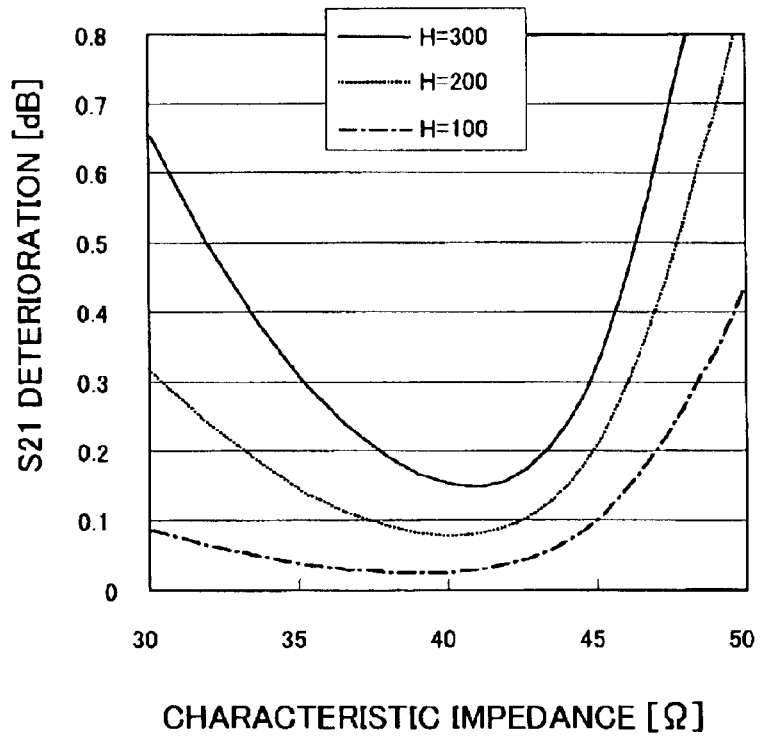

Further, FIGS. 11A and 11B are charts in which the loss by reflection shown in FIGS. 9A, 9B is added to the loss by radiation shown in FIGS. 11A, 10B, respectively. FIG. 11A represents loss when varying pad space S and FIG. 11B represents loss when varying the characteristic impedance.

It is understood from FIG. 11A that the loss caused by reflection and radiation becomes minimum when pad space S is set as 120 μm. Also, from FIG. 11B, it is shown that the loss becomes minimum when the characteristic impedance is set as 40 Ω.

As mentioned earlier, the loss produced in relay substrate 40 and the input side of RF connector 3 is approximately 0.5 dB, as well as the loss produced in relay substrate 40 and the output side of RF connector 3.

Therefore, considering the loss allowed in the input and output portion of electrooptic effect element 2 is up to the equivalent degree, the upper limit and the lower limit in the tolerable range of pad space S when loss S21 is no greater than 0.5 dB varies with pad height H in FIG. 11A.

Figure 14:
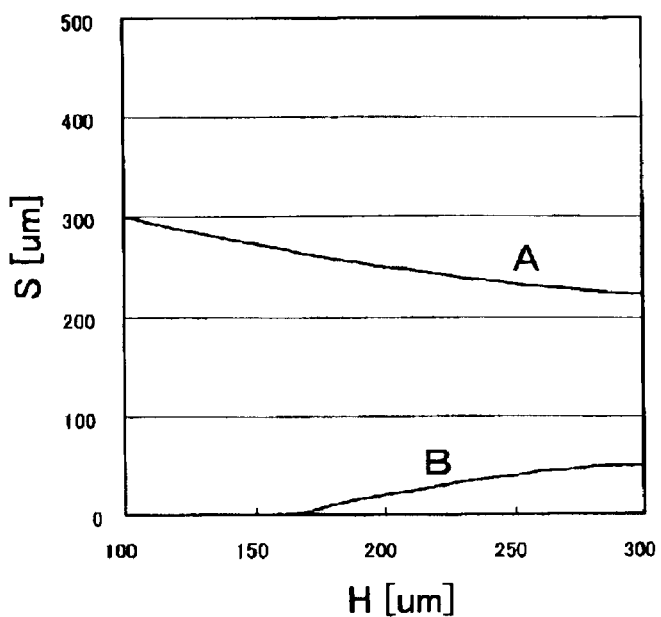
FIG. 14 shows a chart illustrating the tolerable upper limit of a pad space S as well as the tolerable lower limit thereof when varying a pad height H at the modulation frequency of 40 GHz.

FIG. 14 is a chart illustrating upper limit A and lower limit B of pad space S when varying pad height H obtained from the charts shown in FIGS. 11A, 11B.

Accordingly, when the modulation signal has a component of 40 GHz, height H is less than 300 μm and the tolerable range of pad space S has the relation shown below:

$$0.002H^2+1.3H-160 < S < 0.001H^2-0.8H+370$$

where the space between the signal electrode pad and the ground electrode pad of the electrooptic effect element is defined as S μm, and the pad height is defined as H μm.

From this relation, for example when H=300 μm, the tolerable size of S becomes between 50 μm and 220 μm.

Figure 15:
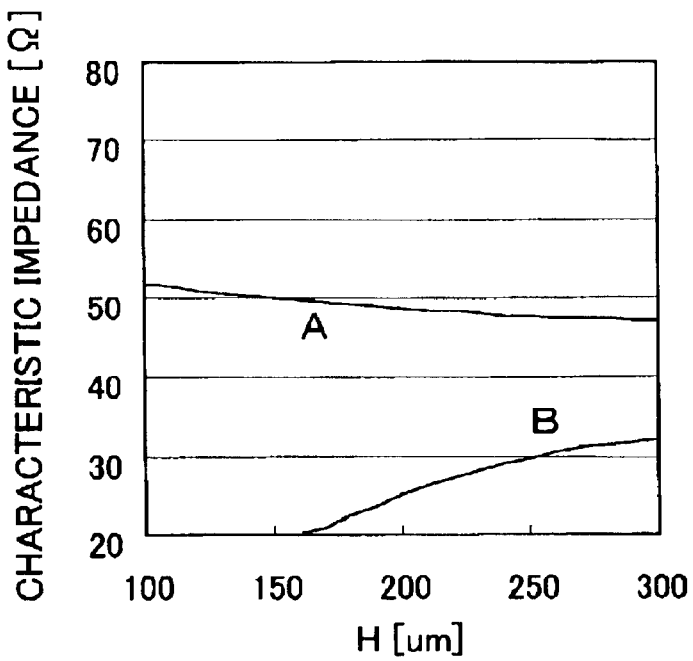
FIG. 15 shows a chart illustrating the tolerable upper limit of the characteristic impedance $Z_0$ as well as the tolerable lower limit thereof when varying pad height H at the modulation frequency of 40 GHz.

As for the characteristic impedance, FIG. 11B indicates that the value which minimizes the loss is 42 Ω. In a similar manner to the above, when the loss of no greater than approximately 0.5 dB is allowed, which is equivalent to the loss produced in the input side and the output side of RF connector 3 and relay substrate 40, a tolerable characteristic impedance $Z_0$ Ω is within the range of upper limit A and lower limit B shown in FIG. 15, which satisfies the relation shown below:

$$-0.0005H^2+0.32H-19<Z_0<0.000093H^2-0.061H+57$$

where $Z_0$ is the characteristic impedance.

From the measured results of the aforementioned embodiments, the loss caused by radiation and reflection in the input portion of electrooptic effect element 2 neither depends on the modulation frequency nor pad height H. The loss becomes minimum either when pad space S is 130 μm or when the characteristic impedance is 42 Ω.

In the aforementioned embodiments, the width of pad 200 of signal electrode 20 is assumed to be 50 μm. The tolerable range which hardly affects the characteristic impedance is the range between 30 μm and 70 μm.

In the above explanation of the embodiments, electrooptic effect element 2 in the optical modulator is assumed to configure with a Z-cut dielectric wafer and a single electrode, and intensity modulation is employed as a modulation scheme. The application of the present invention is not limited to the above structure.

Namely, other optical modulator may be configured with electrode of dual electrode type in the case of a Z-cut dielectric wafer and the intensity modulation scheme. It is also possible to introduce the phase modulation or the polarization modulation as the modulation scheme. Further, in the case the dielectric wafer is formed of X-cut, similar combinations to the above in respect of the electrode and the modulation scheme may also be applied.

The embodiments of the present invention have been described in accordance with the accompanied drawings. By applying the optimal condition on the sizes of pads 200, 210 and 220 provided in the input portion of electrooptic effect element 2, a low voltage modulation signal can be realized while reducing reflection and radiation of a high frequency modulation signal.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. An optical modulator comprising:

an electrooptic effect element having a signal electrode and a ground electrode thereupon each provided with a pad, and varying optical phase by the electrooptic effect a relay substrate constituted of a dielectric wafer on which a coplanar waveguide connected to the signal electrode pad and the ground electrode pad on the electrooptic effect element is formed; and a connector having a center conductor and an external conductor respectively connected to the coplanar waveguide of the relay substrate, and supplying a modulation signal of microwave band to the signal electrode of the electrooptic effect element, wherein, when the modulation signal includes a component of 30 GHz, a pad space between the signal electrode pad and the ground electrode pad of the electrooptic effect element is defined as S μm, and a pad height is defined as H μm, the pad height is no greater than 300 μm, and the relation is set as $$-0.002H^2+1.3H-160<S<0.0025H^2-1.6H+550.$$

2. An optical modulator comprising:

an electrooptic effect element having a signal electrode and a ground electrode thereupon each provided with a pad, and varying optical phase by the electrooptic effect;

a relay substrate constituted of a dielectric wafer on which a coplanar waveguide connected to the signal electrode pad and the ground electrode pad on the electrooptic effect element is formed; and a connector having a center conductor and an external conductor respectively connected to the coplanar waveguide of the relay substrate, and supplying a modulation signal of microwave band to the signal electrode of the electrooptic effect element, wherein, when the modulation signal includes a component of 40 GHz, a pad space between the signal electrode pad and the ground electrode pad of the electrooptic effect element is defined as S μm and a pad height is defined as H μm, the pad height is no greater than 300 μm and the relation is set as $$-0.002H^2+1.3H-160<S<0.001H^2-0.8H+370.$$

3. An optical modulator comprising:

an electrooptic effect element having a signal electrode and a ground electrode thereupon each provided with a pad, and varying optical phase by the electrooptic effect;

a relay substrate constituted of a dielectric wafer on which a coplanar waveguide connected to the signal electrode pad and the ground electrode pad on the electrooptic effect element is formed; and a connector having a center conductor and an external conductor respectively connected to the coplanar waveguide of the relay substrate, and supplying a modulation signal of microwave band to the signal electrode of the electrooptic effect element, wherein, when the modulation signal includes a component of 30 GHz, a characteristic impedance by the signal electrode pad and the ground electrode pad of the electrooptic effect element is defined as $Z_0$ Ω, and a pad height is defined as H μm, the pad height is no greater than 300 μm and the relation is set as $$-0.0005H^2+0.32H-19<Z_0<0.00061H^2-0.34H+98.$$

4. An optical modulator comprising:

an electrooptic effect element having a signal electrode and a ground electrode thereupon each provided with a pad, and varying optical phase by the electrooptic effect;

a relay substrate constituted of a dielectric wafer on which a coplanar waveguide connected to the signal electrode pad and the ground electrode pad on the electrooptic effect element is formed; and a connector having a center conductor and an external conductor respectively connected to the coplanar waveguide of the relay substrate, and supplying a modulation signal of microwave band to the signal electrode of the electrooptic effect element, wherein, when the modulation signal includes a component of 40 GHz, a characteristic impedance by the signal electrode pad and the ground electrode pad of the electrooptic effect element is defined as $Z_0$ Ω, and a pad height is defined as H μm, the pad height is no greater than 300 μm, and the relation is set as $$-0.0005H^2+0.32H-19<Z_0<0.000093H^20.061H+57.$$

5. The optical modulator according to claim 1, wherein the pad space between the signal electrode pad and the ground electrode pad of the electrooptic effect element is set as 130 μm.

6. The optical modulator according to claim 3, wherein the characteristic impedance by the signal electrode pad and the ground electrode pad of the electrooptic effect element is set as 42 Ω.

7. The optical modulator according to claim 1, wherein a width of the signal electrode pad of the electrooptic effect element is between 30 μm and 70 μm.

8. The optical modulator according to claim 1, wherein widths of the signal electrode pad and the ground electrode pad of the electrooptic effect element are 50 μm.

9. The optical modulator according to claim 1, wherein each characteristic impedance of the relay substrate and the connector is set as 50 Ω.

* * * * *

UNITED STATES PATENT AND TRADEMARK OFFICE
CERTIFICATE OF CORRECTION

PATENT NO. : 6,741,378 B2 Page 1 of 1
DATED : May 25, 2004
INVENTOR(S) : Masaki Sugiyama et al.

It is certified that error appears in the above-identified patent and that said Letters Patent is hereby corrected as shown below:

<u>Column 9,</u>
Line 54, after "effect" insert -- ; --.

<u>Column 10,</u>
Lines 27 and 51, after "$\mu$m" insert -- , --.

Signed and Sealed this

Twenty-third Day of November, 2004

JON W. DUDAS
*Director of the United States Patent and Trademark Office*